United States Patent [19]
Voser

[11] 3,725,400
[45] Apr. 3, 1973

[54] PROCESS FOR THE RECOVERY OF HYDROPHILIC ANTIBIOTICS

[75] Inventor: Walter Voser, Allschwil, Switzerland

[73] Assignee: Ciba-Geigy Corporation, Ardsley, N.Y.

[22] Filed: Apr. 28, 1970

[21] Appl. No.: 32,763

[30] Foreign Application Priority Data

May 13, 1969   Switzerland..........................7286/69

[52] U.S. Cl. ...............................................260/243 C
[51] Int. Cl. ...............................................C07d 99/24
[58] Field of Search ..................................260/243 C

[56] References Cited

UNITED STATES PATENTS 3,184,454   5/1965   Abraham et al. .................260/243 C
3,467,654   9/1969   McCormick.......................260/243 C

*Primary Examiner*—Nicholas S. Rizzo
*Attorney*—Harry Goldsmith, Joseph G. Kolodny and Mario A. Monaco

[57] ABSTRACT

The isolation of cephalosporin C from solutions containing it in admixture with impurities stemming from the fermentation broth by adsorption on macroporous, non-ionic adsorption resins with large surface.

9 Claims, No Drawings

PROCESS FOR THE RECOVERY OF HYDROPHILIC ANTIBIOTICS

It is often very difficult to isolate hydrophilic antibiotics from fermentation solutions, especially when the antibiotic is accompanied by other substances having similar physical and chemical properties. According to one method of isolating weakly acidic or weakly basic antibiotics in such cases the antibiotic is adsorbed on ion exchange resins; this method is also used for isolating cephalosporin C. A problem which arose in this connection and which has not yet been solved satisfactorily is the insufficient absorption capacity and selectivity of the ion exchange resins, which are certainly able to adsorb much of the antibiotic from pure solutions of cephalosporin C but not from the impure solutions obtained by fermentation. Thus, for example, the use of ion exchange resins based on polyamines, polystyrenes or polymethacrylic acid does not result in a satisfactory adsorption of cephalosporin C from culture solutions. Nor is it possible to achieve a satisfactory removal of the impurities by combining different ion exchange resins of, for example, acidic and basic nature, and then to adsorb the antibiotic from the prepurified solution without major losses.

The present invention is based on the observation that cephalosporin C can be adsorbed from solutions containing it in admixture with the impurities stemming from the fermentation by using macroporous nonionic adsorption resins having a large surface, and that in this manner fermentation solutions containing cephalosporin C can be prepurified especially advantageously. It is surprising that the said resins adsorb the strongly hydrophilic cephalosporin C quantitatively from the solutions mentioned, especially from the fermentation solutions, whereas they do not adsorb the major portion of the other substances present in the solution. In this manner up to 85 percent of the impurities can be removed from cephalosporin C and the adsorbed Cephalosporin C almost quantitatively eluted, e.g. with an aqueous alcohol. The capacity of the adsorption resin can be increased by previous elimination of lipophilic impurities. The extraction is advantageously carried out in an acidic pH range, for example about 2, with a water-immiscible solvent or mixture of solvents, or preferably with a liquid ion exchanger, e.g. "Amberlite" LA-2, in a water-immiscible solvent or mixture of solvents in a pH range of about 2–7. Examples of water-immiscible solvents are aliphatic, cycloaliphatic, araliphatic and aromatic hydrocarbons with at most 12 carbon atoms which may be substituted by halogen atoms, such as bromine, fluorine, especially chlorine, for example hexane, heptane, cyclohexane, benzine, petroleum ether (b.p. 110°–140°C), kerosenes (b.p. 210°–240°C), carbon tetrachloride, chloroform, methylene chloride, methyl chloroform, ethylene chloride, perchlorethylene, perfluoroethylene, isopropyl bromide, benzene, toluene, xylenes, also esters, particularly lower alkyl esters of lower fatty acids such as acetic acid, butyl acetate, amyl acetate, ketones such as methyl-isobutyl ketone, methyl-isoamyl ketone, ethers such as diisopropyl ether, water-immiscible or slightly miscible alcohols, such as butanol, 2-ethylbutanol, ethylhexanol, cyclopentanol, cyclohexanol.

From the solutions of cephalosporin C obtained by elution of the macroporous adsorption resin the antibiotic can be purified with the conventional ion exchange resins so far that it can be precipitated from their eluates directly in the form of the free acid or crystallized in the form of a sparingly soluble salt or complex. The resulting product can be further processed as it is to form 7-aminocephalosporanic acid and its active acylation products.

Accordingly, the present process is characterized in that cephalosporin C is adsorbed from solutions containing it in admixture with impurities stemming from the fermentation, if desired after extractive prepurification with lipophilic solvents and/or liquid ion exchangers in a pH range of about 2–7, on macroporous nonionic adsorption resins having a large surface.

As macroporous nonionic adsorption resins there come into considerations resins having an aromatic basic structure with an average pore diameter of 4–20 nm, preferably 7–10 nm, especially polystyrene resins having a surface from 100 to 1000 m$^2$ per gram, for example the styrene-divinyl benzene copolymers marketed under the trade names "Amberlite" XAD-1, XAD-2, XAD-4 and XAD-5 (makers Rohm & Haas Co.).

The treatment with the adsorption resin is advantageously carried out at a pH value of from 1 to 8, preferably 2 to 3; this pH value can be adjusted with any desired acid, for example to an organic acid such as oxalic acid, or preferably with a mineral acid, such as hydrochloric, phosphoric or especially sulfuric acid. It is advantageous to acidify the fermentation broth before filtering it and then to filter it in the usual manner, advantageously in the presence of a filter aid.

The optionally pre-extracted culture solution is brought into contact with the adsorption resin in the usual manner, preferably with the use of columns containing the resin bed. The adsorption then takes place while the solution percolates through the column. The percolate contains no antibiotic or only a slight quantity. The residual solution is displaced from the column by means of water. The washing percolate likewise contains no antibiotic or only a slight quantity.

For eluting the antibiotic from the resin there may be used mixtures of water with water-miscible organic solvents, especially aqueous solutions of lower alkanols. An aqueous isopropanol of 10 to 20 percent strength is specially suitable.

The resin can be regenerated with alkaline aqueous or aqueous-alcoholic solutions, for example a mixture of methanol and water (1 : 1) containing sodium hydroxide (1-N). The residues of sodium hydroxide can be removed, for example, by washing with an acid, e.g. sulfuric acid and/or water. The regeneration can also be carried out, for example, with aqueous sodium hypochlorite. The oxidant can be removed from the column with a reducing agent e.g. a solution of sodium bisulfite or thiosulfate.

A treatment with acetone or a mixture of acetone and water can complete the regeneration in combination with the mentioned regenerating agents.

As is usual, the whole process of the adsorption and of the regeneration of the resin can be performed batch-wise or continuously in separate columns or combined columns.

The eluate containing cephalosporin C can be further purified in the usual manner, preferably by adsorption on a basic ion exchange resin such as "Amberlite IR-4B" (phenolpolyamine containing primary and secondary amino groups), "Amberlite IRA-68" (methacrylic acid polymer), "Amberlite XE-265" (polymine), "Imac A 13 T or A 17 P" (makers Imactic Maatsch.). These ion exchange resins have for the adsorption of cephalosporin C from the eluate a much greater capacity than from the culture filtrate. From the eluates of the ion exchanger cephalosorin C can, e.g. after concentration, be precipitated as the free acid, e.g. by means of water-miscible organic solvents such as acetone or isopropanol, or it can be isolated as sparingly soluble microcrystalline heavy-metal complex, e.g. a complex with copper, mercury, cadmium, lead, manganese, iron, cobalt, nickel or especially zinc (see application Ser. No. 830,334, filed June 4, 1969 by Hans Bickel et al.) or as a salt, e.g. sodium, or barium salt or a salt with an amine, e.g. triethylamine or ethanolamine.

The following Examples illustrate the invention.

EXAMPLE 1

A culture broth is prepared in the known manner by cultivating a strain, capable of producing cephalosporin C, of the genus Cephalosporium, in a nutrient medium; when the maximum production of cephalosporin C has been reached, the culture broth is cooled to 15°C and adjusted with 50 % w/v sulfuric acid to a pH value from 2.8 to 3.0. The mycelium and the insoluble content of the nutrient medium are filtered off with addition of a filter aid, for example "Dicalite". The culture filtrate thus obtained has a pH value of 3; it contains 2.1 g of cephalosporin C per liter and 5.4 percent of dry residue. It is of brown color.

6 Liters of "Amberlite XAD-2", together with water, are poured into a glass column of 10 cm diameter in the manner usually employed with ion exchange resins. The resin bed is 76 cm high. Through this column 6 liters of the culture filtrate obtained as described above are percolated at a rate of 6 liters per hour. At the same percolation rate the filtrate is displaced with 3 liters of deionized water and the column is eluted with aqueous isopropanol of 10 percent strength. The adsorption and washing percolates are collected in 1.5 liter fractions, and the yellow-orange eluates in 1 liter-fractions. The "Amberlite XAD-2" is regenerated with 6 liters of aqueous methanol of 50 percent strength whose content of sodium hydroxide solution is 1-N, and the regenerating agent is washed out with water. The column can then be used for a fresh adsorption.

The result of the adsorption/elution is as follows: About 65–70 percent of the impurities of the culture filtrate are present in the biologically inactive percolation and washing fractions, as well as in the first two eluate fractions which contain only a trace of cephalosporin C.

The biologically active eluate fractions have a volume of 12 liters and contain 95 percent of the cephalosporin C present in the culture filtrate, as well as 20–25 percent of the impurities of the culture filtrate. The active eluate fractions contain no inorganic anions.

EXAMPLE 2

4 Liters of a culture filtrate, which contains 2.2 g of cephalosporin C per liter and has been prepared as described in Example 1, but which has been acidified with oxalic acid instead of with sulfuric acid, was percolated at a rate of 12 liters per hour through the column filled with "Amberlite XAD-2" described in Example 1. The percolate was displaced with 3 liters of deionized water and the column was eluted with a total of 12 liters of aqueous isopropanol of 10 percent strength. To regenerate the "Amberlite XAD-2" the column is eluted with a sodium hypochlorite solution containing 3 percent of active chlorine, and then with 4 liters of 0.2 percent sodium bisulfite solution. Then the cycle begins once more by adsorption of 4 liters of culture filtrate. The average yield of cephalosporin C resulting from several successive cycles is 85.2 percent as active eluate fractions which contain no inorganic anions. 9.2 percent are present in the first eluate fractions which still contain inorganic anions, and can be isolated by another adsorption. The active main eluates contain 30–35 percent of the impurities present in the culture filtrate.

EXAMPLE 3

30 Liters of a culture filtrate, which has been prepared as described in Example 1 and contains 2.10 g of cephalosporin C per liter, is percolated at a rate of 30 liters per hour through a column of 30 liters of "Amberlite XAD-2". The internal diameter of the column is 15 cm. The culture filtrate is displaced with 15 liters of deionized water and the column is eluted with 60 liters of aqueous isopropanol of 10% strength at a rate of 60 liters per hour. The bulk of cephalosporin C is present in 45 liters of eluate. The "Amberlite XAD-2" is then regenerated by successive percolation of 15 liters of N-sodium hydroxide solution, 10 liters of 0.2N-sulfuric acid and 10 liters of water. The cycle is then begun again by adsorption of 30 liters of culture filtrate. The average yield of cephalosporin C in the active eluate fractions present by several successive cycles is 95 percent; these fractions contain no inorganic anions. About 3 percent of cephalosporin C is contained in the first eluate fractions which still contain chlorine and sulfate ions. From these fractions the antibiotic can be recovered by renewed adsorption. The active main eluates contain 28 percent of the dry substance present in the culture filtrate. "Amberlite IRA-68" is suspended in 10 percent aqueous isopropanol and poured into a glass column of 5 cm internal diameter. The filling volume is 1 liter. Through this column 45 liters of the eluate obtained above are percolated. The adsorption solution contains 1367 mg of cephaolosporin C per liter, and its solids content is 0.684 percent. The adsorption rate is 10 liters per hour. The adsorption solution is displaced with 1 liter of water. The adsorption and washing percolate contains 3 percent of the total cephalosporin C and, about 35–40 percent of the impurities present in the adsorption solution.

Cephalosporin C is eluted with a pyridine acetate buffer, pH value 5.5. The buffer is 0.44 molar as far as pyridine is concerned and 0.2 molar as far as acetic acid is concerned. The elution rate is 1 liter per hour. 92.3 percent of the total amount of cephalosporin C are present in 3 liters of eluate of the main fractions containing 18.5 grams of cephalosporin C per liter. Another 3 percent are present in 1.25 liters of secondary fractions.

The main fractions, which have a pH value of 4.9, are mixed with 185 g of zinc acetate, and within 20 minutes 3 liters of isopropanol are stirred into the clear solution. Towards the end of the addition the cephalosporin C-zinc complex begins to crystallize out. The mixture is cooled to 2°C and stirred for 4 hours at 2°C. The precipitate is suctioned off and washed with 2 × 300 ml of water and once with 300 ml of acetone and dried under vacuum at 40°C. The yield amounts to 36.6 g of cephalosporin C-zinc complex as a white powder which has a content of 91.6 percent as determined by measuring the ultraviolet absorption.

EXAMPLE 4

The adsorption/elution with "Amberlite IRA-68" described in Example 3 is performed in identical manner with "Amberlite XE-265"; 50 liters of the XAD-2 eluate obtained according to Example 3 are adsorbed. The adsorption and washing eluate contains 5.9 percent of the total cephalosporin C and about 40–45 percent of the impurities present in the adsorption solution.

Cephalosporin C is eluted as described in Example 3, with pyridine acetate buffer. 75.4 percent of the total amount of cephalosporin C is present in the 4 liters of eluate of the main fractions containing 12.05 grams of cephalosporin C per liter. Another 9.5 percent are present in 2.75 liters of secondary fractions.

The main fractions are concentrated to 400 ml and the concentrate is stirred into 4.8 liters of isopropanol. The voluminous precipitate is suctioned off, washed with 200 ml of isopropanol and 200 ml of acetone and then dried under vacuum at 40°C, to yield 45 g of a beige-colored powder which according to the biological test contains 84.3 percent of cephalosporin C. The precipitation yield amounts to 56 percent. From the mother liquor the remaining cephalosporin C can be isolated to a great extent after concentration and further precipitation.

EXAMPLE 5

200 ml of "Amberlite XAD-2" in water are poured into a glass column of 2.5 cm diameter. 200 ml of culture filtrate, which contains 1.96 g of cephalosporin C per liter and has been obtained as described in Example 1, is adjusted with sulfuric acid to a pH value of 2 and percolated through the "Amberlite XAD-2" at a rate of 400 ml per hour. The filtrate is displaced with 100 ml of deionized water and cephalosporin C is eluted with aqueous isopropanol of 10 percent strength. The column is regenerated as described in Example 2 and used again for adsorption. The percolation and washing fractions contain no cephalosporin C. The first eluate fractions, which still contain inorganic anions, contain 8 percent, and the other eluate fractions contain 90 percent of the cephalosporin C present in the culture filtrate.

EXAMPLE 6

30 Liters of a culture filtrate, which has been prepared as described in Example 2 and containing 2.12 g of cephalosporin C and about 34 g of impurities per liters, are extracted on a countercurrent extractor with 15 liters of a solution of 5 percent "Amberlite LA-2" (free base) in 2-ethyl hexanol. The constituents dissolved in the extracted culture filtrate decrease from about 3.6 percent to about 3.35 percent. 12 Liters of the extracted culture filtrate are adjusted to a pH value of 2.7 with sulfuric acid of 50 percent strength, percolated through 6 liters of "Amberlite XAD-2" at a rate of 6 liters an hour and displaced with 3 liters of deionized water. The percolate contains no cephalosporin C. The adsorbed cephalosporin C is eluted with a total of 12 liters of aqueous isopropanol of 10 percent strength. The eluate contains 97 percent of the cephalosporin C present in the culture filtrate (about 2 percent are in a salt-containing prefraction). In the eluate, 15 percent of the contaminants of the culture filtrate are still present.

The "Amberlite XAD-2" is then regenerated as described in Example 2 and additionally percolated through with 3 liters of acetone+water in a ratio of 1:1. The acetone is displaced with water, whereupon the column is ready for another adsorption.

I claim:

1. A process for the isolation of cephalosporin C from solutions containing it in admixture with impurities stemming from the fermentation broth, which comprises treating the solutions, having a pH value of 1–8, on macroporous, non-ionic styrene-divinylbenzene copolymer adsorption resins with an average pore diameter of 4–20 mm and a surface from 100 to 1000 $m^2$ per gram.

2. A process as claimed in claim 1, wherein the filtrate of a fermentation broth acidified to the requisite pH is used as starting solution.

3. A process as claimed in claim 1, wherein the filtrate of a fermentation broth acidified to the requisite pH with sulfuric acid or oxalic acid is used as starting solution.

4. A process as claimed in claim 1, wherein a culture filtrate that is pre-extracted with a liquid ion exchanger in a water-immiscible organic solvent at a pH of about 2–6, is used as starting solution.

5. A process as claimed in claim 1, wherein a mixture of water and a water-miscible organic solvent is used for the elution of cephalosporin C from the adsorption resin.

6. A process as claimed in claim 1, wherein a mixture of water and a lower alkanol is used for the elution of cephalosporin C from the adsorption resin.

7. A process as claimed in claim 1, wherein the resin is regenerated with alkaline aqueous or aqueous-alcoholic solutions.

8. A process as claimed in claim 1, wherein the process is carried out continuously.

9. A process as claimed in claim 1, wherein the solutions are pre-extracted with lipophilic solvents and/or liquid ion exchangers at a pH range of about 2–7.

* * * * *